United States Patent
Yu et al.

(10) Patent No.: US 12,346,259 B1
(45) Date of Patent: Jul. 1, 2025

(54) CACHE RESOURCE PRIORITIZATION FOR HETEROGENEOUS MULTI-PROCESSING (HMP) ARCHITECTURE

(71) Applicant: QUALCOMM Incorporated, San Diego, CA (US)

(72) Inventors: Aiqun Yu, Shanghai (CN); Yiwei Huang, Shanghai (CN); Junwei Liao, Shanghai (CN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/635,389

(22) Filed: Apr. 15, 2024

(51) Int. Cl.
 *G06F 12/0811* (2016.01)
 *G06F 12/0871* (2016.01)

(52) U.S. Cl.
 CPC ...... *G06F 12/0871* (2013.01); *G06F 12/0811* (2013.01)

(58) Field of Classification Search
 CPC ............. G06F 12/0842; G06F 12/0848; G06F 12/0811; G06F 12/0871; G06F 2212/6042; G06F 2212/282
 USPC .................................................. 711/118, 129
 See application file for complete search history.

(56) References Cited

U.S. PATENT DOCUMENTS

| | | | | |
|---|---|---|---|---|
| 2012/0166723 | A1* | 6/2012 | Araki ................. | G06F 12/0246 711/E12.019 |
| 2016/0139964 | A1* | 5/2016 | Chen .................... | G06F 1/3206 718/104 |
| 2023/0034837 | A1* | 2/2023 | Suryanarayana ... | G06F 9/45558 |

* cited by examiner

*Primary Examiner* — Hashem Farrokh
(74) *Attorney, Agent, or Firm* — Neugeboren O'Dowd PC

(57) ABSTRACT

Cache resource prioritization for Heterogeneous Multi-Processing (HMP) architecture. One embodiment is an apparatus including HMP cores, a cache including cache partitions assigned to different levels of the HMP cores, a performance monitoring unit (PMU) configured to track a performance attribute for each of the cache partitions, and a controller. The controller is configured, for each of a plurality of successive time windows, to: obtain a performance value for each of the cache partitions based on the performance attribute tracked by the PMU, determine a predicted cache size for each of the cache partitions based on performance values obtained for previous time windows, calculate a cache size for each of the cache partitions by multiplying the predicted cache size with a weighted value, and direct a size adjustment of each of the cache partitions based on the calculated cache size.

20 Claims, 7 Drawing Sheets ial processing unit (CPU), and shared memory 150 coupled to the multi-core processor 130.

CACHE RESOURCE PRIORITIZATION FOR HETEROGENEOUS MULTI-PROCESSING (HMP) ARCHITECTURE

BACKGROUND

Field

The present disclosure relates generally to multi-core processor systems, and more specifically, to prioritizing cache resources in a Heterogeneous Multi-Processing (HMP) architecture.

Background

A device with Heterogeneous Multi-Processing (HMP) has multiple different types of processor cores to balance performance and power efficiency. For example, a high-performance core may handle demanding computational tasks, while a low-power core may handle background tasks. HMP is useful for various devices, such as smartphones, tablets, and laptops, in which the balance between performance and energy efficiency (i.e., battery life) is a key consideration.

In a HMP device, different core types may compete for access to a shared cache. This competition can cause cache misses that reduce overall performance. Some multi-core devices implement a shared cache that is partitioned to provide a dedicated space for each core to mitigate the impact of this competition. However, in conventional HMP devices, the partitioned cache spaces are often inefficiently used due to the fixed or static nature of the partition sizes.

SUMMARY

According to an aspect, an apparatus includes a plurality of Heterogeneous Multi-Processing (HMP) cores having different levels of processing capability, a cache including cache partitions assigned to the different levels of the HMP cores, and a performance monitoring unit (PMU) configured to track a performance attribute for each of the cache partitions. The apparatus also includes a controller configured, for each of a plurality of successive time windows, to: obtain a performance value for each of the cache partitions based on the performance attribute tracked by the PMU; determine a predicted cache size for each of the cache partitions based on performance values obtained for a previous N successive time windows, wherein N is an integer greater than one; calculate a cache size for each of the cache partitions by multiplying the predicted cache size with a weighted value, wherein the weighted value is larger for a cache partition associated with a HMP core having higher processing capability; and direct a size adjustment of each of the cache partitions based on the calculated cache size.

According to another aspect, a method for dynamically partitioning a cache shared by a plurality of Heterogeneous Multi-Processing (HMP) cores having different levels of processing capability is disclosed. The method includes partitioning the cache into cache partitions assigned to the different levels of the HMP cores, and tracking a performance attribute for each of the cache partitions. The method also includes, for each of a plurality of successive time windows: obtaining a performance value for each of the cache partitions based on the performance attribute tracked; determining a predicted cache size for each of the cache partitions based on performance values obtained for a previous N successive time windows, wherein N is an integer greater than one; calculating a cache size for each of the cache partitions by multiplying the predicted cache size with a weighted value, wherein the weighted value is larger for a cache partition associated with a HMP core having higher processing capability; and directing a size adjustment of each of the cache partitions based on the calculated cache size.

According to yet another aspect, a non-transitory processor-readable medium is disclosed that comprises instructions for execution by a processor or for configuring a field programmable gate array, the instructions configured for dynamically partitioning a cache shared by a plurality of Heterogeneous Multi-Processing (HMP) cores having different levels of processing capability, and the instructions comprising instructions to: partition the cache into cache partitions assigned to the different levels of the HMP cores; track a performance attribute for each of the cache partitions; and for each of a plurality of successive time windows: obtain a performance value for each of the cache partitions based on the performance attribute tracked; determine a predicted cache size for each of the cache partitions based on performance values obtained for a previous N successive time windows, wherein N is an integer greater than one; calculate a cache size for each of the cache partitions by multiplying the predicted cache size with a weighted value, wherein the weighted value is larger for a cache partition associated with a HMP core having higher processing capability; and direct a size adjustment of each of the cache partitions based on the calculated cache size.

DETAILED DESCRIPTION

The following modes, features or aspects, given by way of example only, are described in order to provide a more precise understanding of the subject matter of several embodiments.

Figure 1:
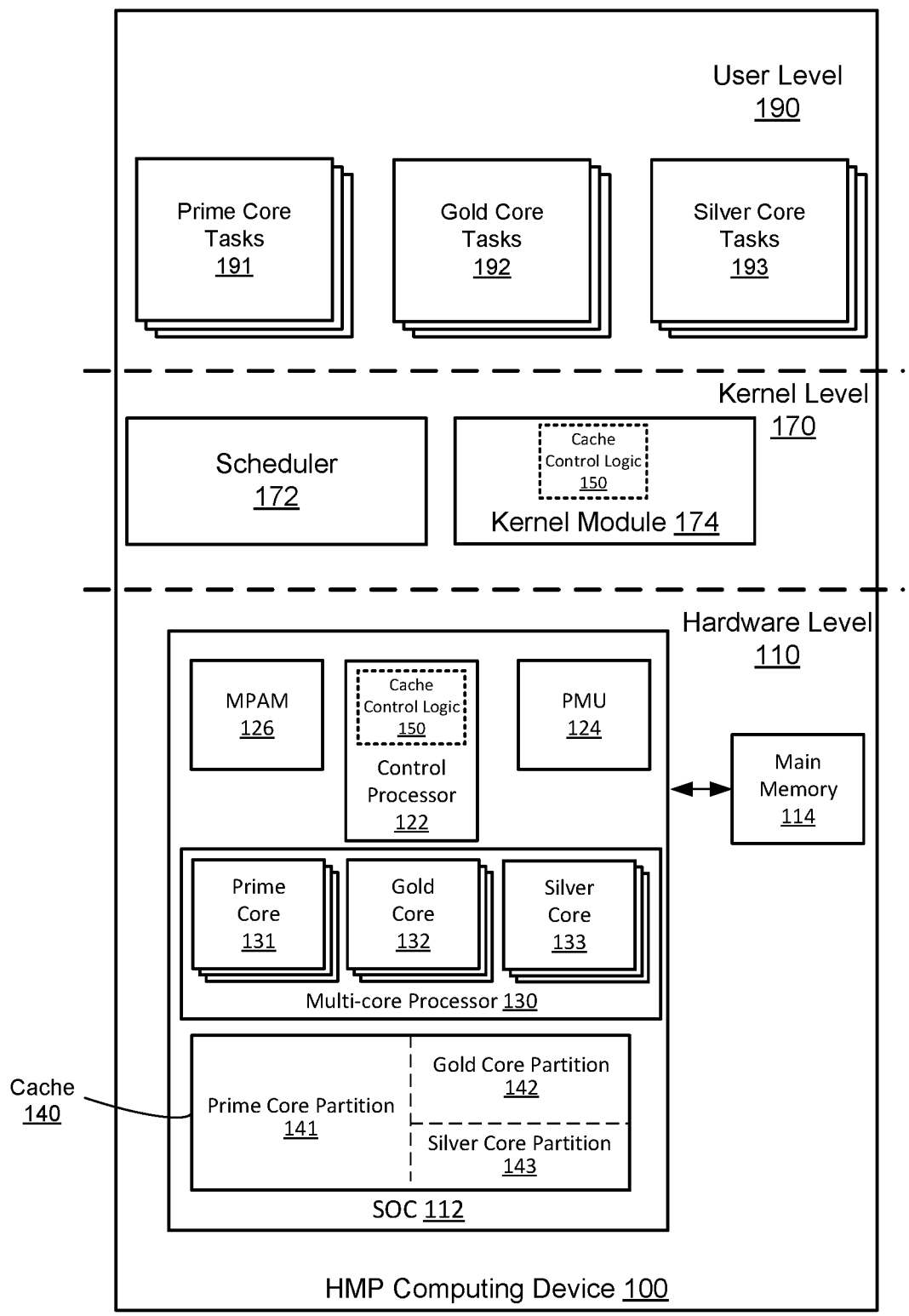
FIG. 1 is a block diagram of a Heterogeneous Multi-Processing (HMP) computing device in accordance with an embodiment of this disclosure.

FIG. 1 is a block diagram of a Heterogeneous Multi-Processing (HMP) computing device 100 in accordance with an embodiment of this disclosure. HMP computing device 100 is described with respect to a hardware level 110, kernel level 170, and user level 190. At the hardware level 110, HMP computing device 100 includes a system-on-chip (SoC) 112 having a multi-core processor 130, or central processing unit (CPU), with multiple types of cores 131-133 of different levels of performance capabilities. This heterogenous architecture enables a single chip or CPU to handle diverse workloads with improved performance, power efficiency, and versatility as compared to a symmetric multiprocessing (SMP) system.

In one embodiment, multi-core processor 130 includes three core types: a prime core 131 or high-performance core, a gold core 132 or medium-performance core, and a silver core 133 or low-power core. A scheduler 172, which operates at the kernel level 170, may determine which type of core is best suited for executing tasks 191-193 operating at the user level 190. That is, scheduler 172 may classify tasks as one of a prime core task 191, gold core task 192, or silver core task 193. This classification may be based on task attributes such as computational intensity, priority, and resource utilization. As an example, multi-core processor 130 may include one or more prime cores 131 to handle computationally intensive tasks such as gaming and video editing, one or more gold cores 132 to handle moderate computing tasks such as web browsing, and one or more silver cores 133 to handle tasks with low processing demands such as email synchronization. Tasks 191-193 may also be split up among cores 131-133. For instance, in some scenarios, gaming or video editing applications may have some tasks executing on prime cores 131, some tasks executing on gold cores 132, and some tasks executing on silver cores 133.

As cores 131-133 execute tasks 191-193, they may request data and instructions from a shared cache 140. In particular, cache 140 may be partitioned into a prime core partition 141, gold core partition 142, and silver core partition 143. Cache 140 may thus comprise a Level 3 (L3) cache that is shared among different types of cores 131-133. L1 cache may provide the fastest but smallest cache level and be located directly on each individual core. L2 cache may be larger than L1 and be shared among multiple cores of the same type (e.g., a cluster such as multiple prime cores 131). Cache 140 or L3 cache may be larger than L2 and provide a common cache pool accessible by any or all core types, enhancing overall system performance by allowing cores to access data quickly.

In conventional HMP devices, the L3 cache is inefficiently used. In particular, the different core types have no restrictions on which cores can request L3 cache resources. As a result, competition among different cores for cache resources can lead to cache evictions, and subsequently, cache misses for certain cores. When a cache miss occurs in L3 cache, the data is instead fetched from main memory 114 (e.g., Double Data Rate (DDR) memory), incurring significant latency due to its slower speed.

HMP computing device 100 is therefore enhanced with cache control logic 150 configured to implement a partitioning mechanism of cache 140, or L3 cache, that is aware of, and effectively prioritizes, the multiple types of cores 131-133 with different levels of performance capabilities. In particular, cache control logic 150, sometimes referred to herein as a controller, is configured to dynamically direct size adjustments of partitions 141-143 according to cache usage predictions/calculations of types of cores 131-133. Additionally, cache control logic 150 may dynamically reconfigure cache resources based on detected idle cores. Advantageously, cache control logic 150 leverages the HMP architecture and partition mechanisms to balance the competing goals of increased performance, reduced cache contention, and improved energy efficiency.

Cache control logic 150 may comprise a component of control processor 122 and/or kernel module 174, as indicated by its dashed outline of FIG. 1. Control processor 122 may comprise a hardware processing unit that is separate from multi-core processor 130 and configured to manage system-level functions and resources. Kernel module 174 may comprise a software component that extends the functionality of the operating system kernel. In some embodiments, control processor 122 and kernel module 174 work in tandem to optimize cache resource allocation. Control processor 122 and/or kernel module 174 may be enhanced with cache control logic 150 to determine dynamic size adjustments of partitions 141-143 based on performance data of cores 131-133.

Cache control logic 150 is configured to receive performance-related data from a performance monitoring unit (PMU) 124. PMU 124 is a hardware component configured to track a variety of performance-related metrics at the processor level, which may include monitoring cache and/or core performance. SoC 112 may include one or more PMUs 124 with programmable counters to collect performance data of cores 131-133 and/or partitions 141-143 of cache 140. For example, PMU 124 may be configured with a programmable counter configured to operate within specified time windows to accumulate a count for one or more events, providing a snapshot of performance metrics for a particular core, or type of core, during those intervals. Performance data includes, for example, a cache miss count, a payload bytes count of memory bandwidth usage, an instruction count, a cycle count, and/or a reference count.

With performance-related data received from PMU 124, cache control logic 150 may predict/calculate the size of partitions 141-143, and direct the size adjustment. In one embodiment, cache control logic 150 directs a memory system resource partitioning and monitoring (MPAM) module 126 to dynamically adjust partitions 141-143. MPAM module 126 may comprise registers to control and configure the size of partitions 141-143 and thus control the allocation of cache resources available to cores 131-133. MPAM registers may also be involved in controlling when certain cache lines are powered down for power efficiency. Additional details of operation are described below.

Figure 2:
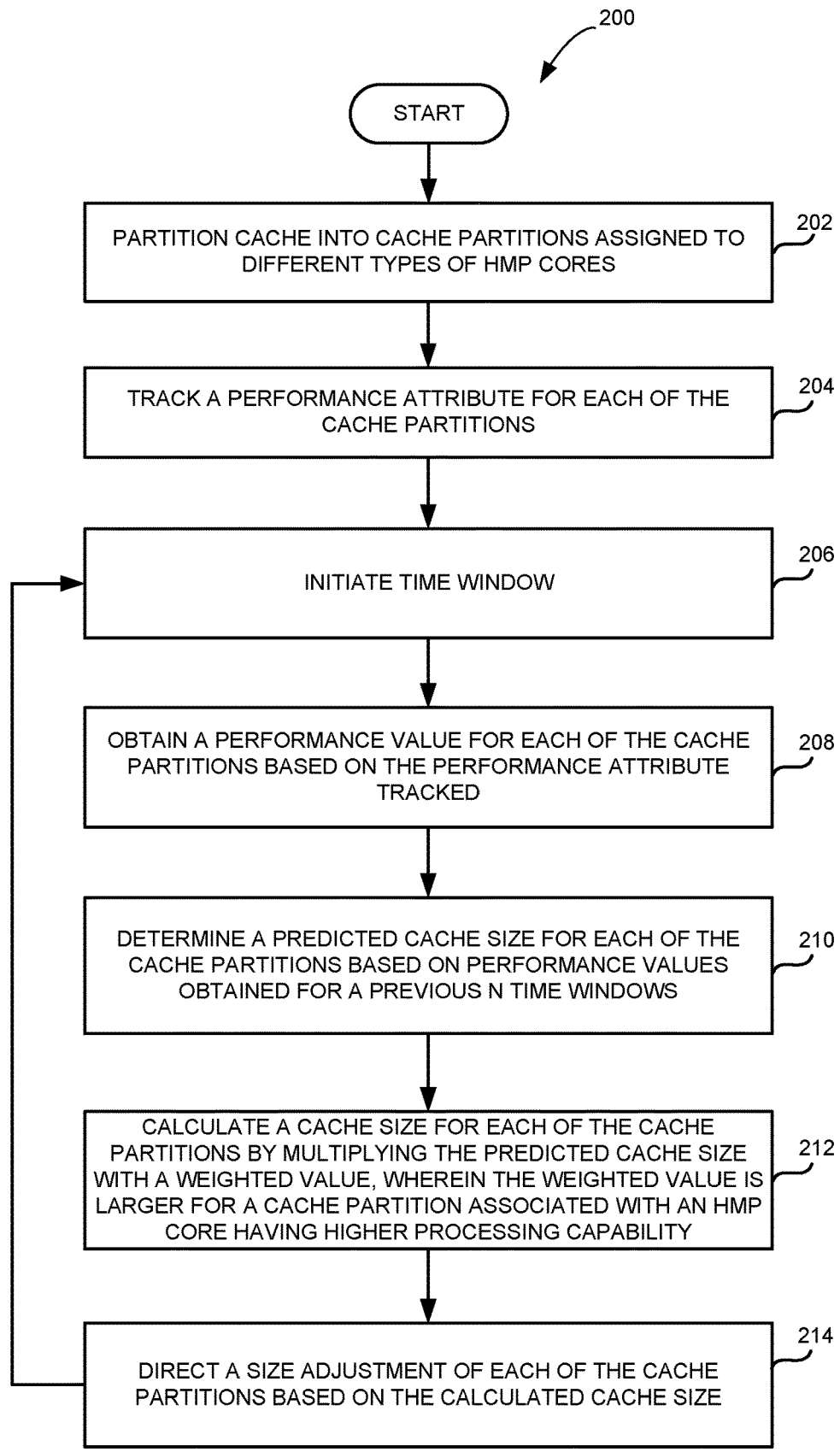
FIG. 2 is a flowchart illustrating a method of dynamically partitioning a cache shared by a plurality of HMP cores having different levels of processing capability in an example embodiment.

FIG. 2 is a flowchart illustrating a method 200 of dynamically partitioning a cache shared by a plurality of HMP cores having different levels of processing capability in an example embodiment. The steps of the flowcharts herein are described with reference to HMP computing device 100 of FIG. 1, but those skilled in the art will appreciate that the steps may be performed in other systems and devices. The steps of the flowcharts described herein are not all inclusive, may include other steps not shown, and may be performed in an alternative order.

In step 202, cache 140 is partitioned into partitions 141-143 that are assigned to different types of HMP cores. For example, cache 140 may include prime core partition 141 assigned to prime core(s) 131, gold core partition 142 assigned to gold core(s) 132, and silver core partition 143 assigned to silver core(s) 133.

In step 204, one or more PMUs 124 track a performance attribute for each partition 141-143. In step 206, a time window is initiated. In step 208, a controller (e.g., cache control logic 150) obtains a performance value for each partition 141-143 based on the performance attribute tracked.

In step 210, the controller determines a predicted cache size for each partition 141-143 based on the performance values obtained for a previous N time windows, wherein N is an integer greater than one. In step 212, the controller calculates a cache size for each partition 141-143 by multiplying the predicted cache size with a weighted value, wherein the weighted value is larger for a cache partition associated with a HMP core having higher processing capability. In step 214, the controller directs a size adjustment of each partition 141-143 based on the calculated cache size. Steps 206-214 may repeat for successive time windows or intervals to continuously adjust the partition sizes.

Figure 3:
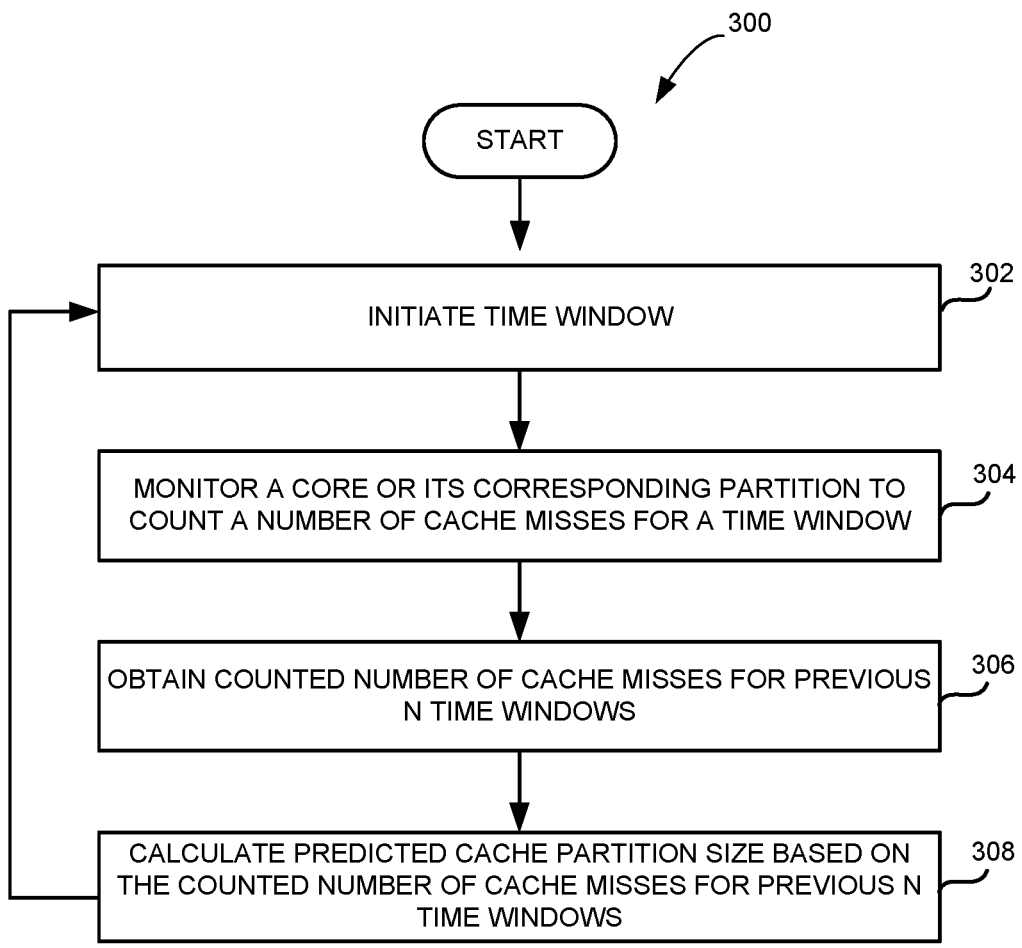
FIG. 3 is a flowchart illustrating a method of predicting cache size for HMP cores in an example embodiment.

FIG. 3 is a flowchart illustrating a method 300 of predicting cache size for HMP cores in an example embodiment. In step 302, a time window is initiated. For example, PMU 124 may be programmed to operate in four millisecond time intervals. In step 304, PMU 124 monitors a core or its corresponding partition to count a number of cache misses during the time window. In step 306, a controller obtains a counted number of cache misses for a previous N time windows. For example, the controller may be programed to obtain the count of cache misses for the five most recent time windows.

In step 308, the controller calculates the predicted cache partition size based on the counted number of cache misses for the previous N time windows. For example, after determining a maximum value or average value of the previous N time windows, the controller may calculate the predicted cache partition size by multiplying that value by the cache line size of the partition. Steps 302-308 may be performed on a per-core basis.

Additionally, steps 302-308 may repeat for successive time windows or intervals to continuously adapt cache resources based on cache misses. Accordingly, the number of cache misses over a period is used to predict a partition size that it is sufficient to hold the working set of data and instructions for the corresponding core executing the application.

Figure 4:
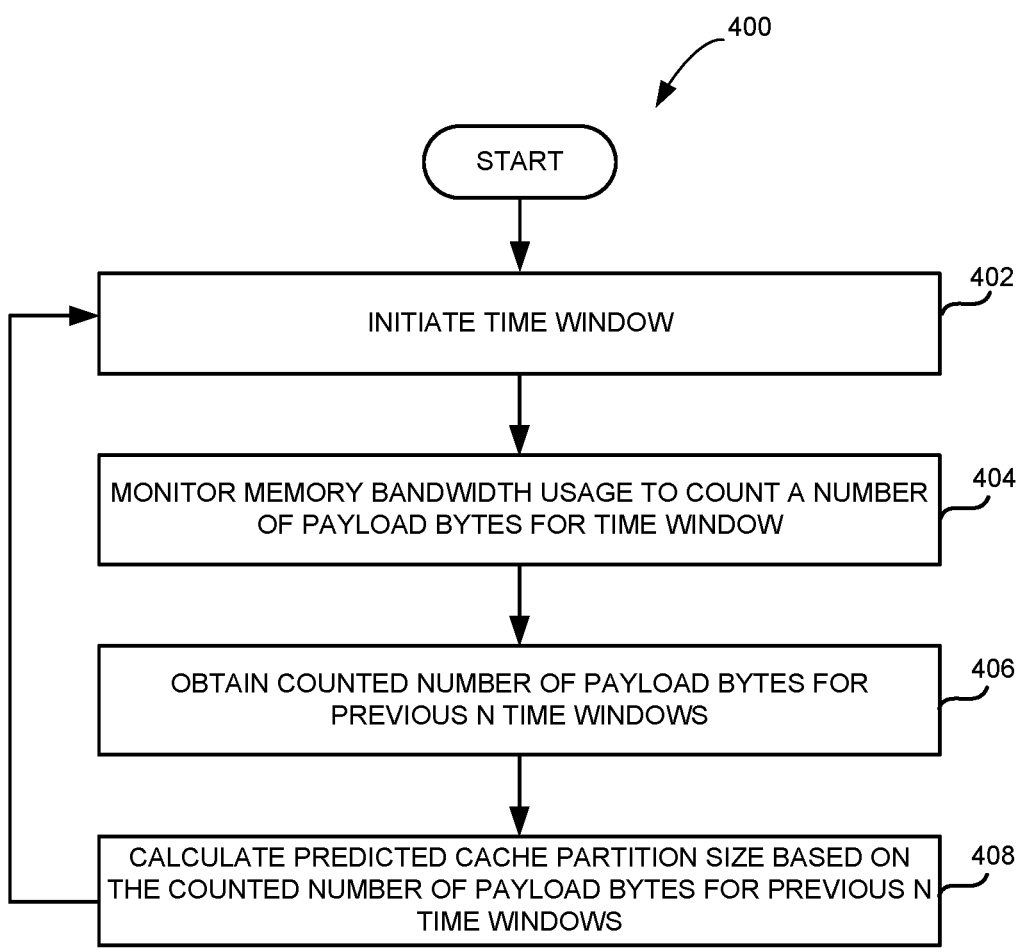
FIG. 4 is a flowchart illustrating another method of predicting cache size for HMP cores in an example embodiment.

FIG. 4 is a flowchart illustrating another method 400 of predicting cache size for HMP cores in an example embodiment. In step 402, a time window is initiated. In step 404, PMU 124 monitors memory bandwidth usage to count a number of payload bytes for the time window. The payload bytes of memory bandwidth usage may provide a measurement of the volume of data transferred to a partition.

In step 406, a controller obtains a counted number of payload bytes for the previous N time windows. In step 408, the controller calculates or determines the predicted cache partition size based on the counted number of payload bytes for the previous N time windows. For example, the predicted cache partition size may be based on a maximum value or average value of payload bytes for the five most recent time windows.

Alternatively or additionally, the controller may predict a partition size based on an instruction count, a cycle count, and/or a reference count. In one embodiment, a programmable weight is applied to each of a cache miss count, instruction count, cycle count, and reference count, and the controller sums the weighted counts to calculate the predicted cache size. An instruction count represents the total number of instructions executed by a core during a specified period. A higher instruction count may indicate a more complex workload or program with more executed instructions. A cycle count refers to the total number of clock cycles consumed by a core during the execution of a program or task. A lower cycle count indicates that the core is executing instructions more efficiently, possibly due to better pipelining, instruction-level parallelism, or other architectural optimizations. A reference count refers to the total number of memory references or accesses made by a task. A high reference count indicates frequent access to memory, and optimizing cache usage can help reduce the impact of memory latency.

Figure 5:
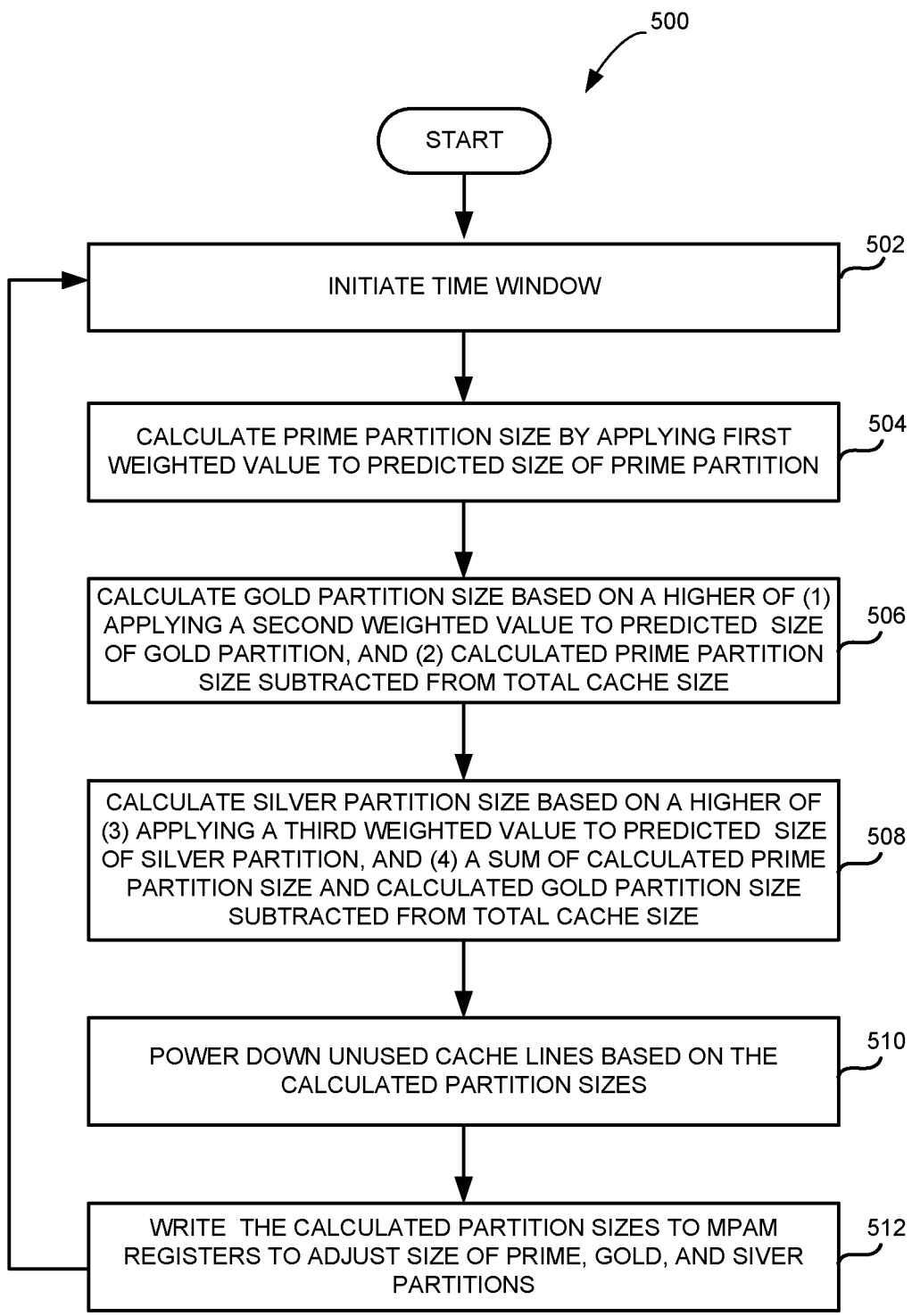
FIG. 5 is a flowchart illustrating another method of dynamically partitioning a cache shared by a plurality of HMP cores having different levels of processing capability in an example embodiment.

FIG. 5 is a flowchart illustrating another method 500 of dynamically partitioning a cache shared by a plurality of HMP cores having different levels of processing capability in an example embodiment. In step 502, a time window is initiated. For example, PMU 124 may be programmed to operate in four millisecond time intervals.

In step 504, the controller calculates the size of prime partition 141 by applying a first weighted value to the predicted size of prime partition 141. In general, weighted values may prioritize cache resources for faster processing capability. For example, a first weighted value for prime core(s) 131 may comprise a value of one hundred, a second weighted value for gold core(s) 132 may comprise a value of fifty, and a third weighted value for silver core(s) 133 may comprise a value of one.

In step 506, the controller calculates the size of gold partition 142 based on a higher of (1) applying a second weighted value to the predicted size of gold partition 142, and (2) the calculated size of prime partition 141 subtracted from the total size of cache 140. In step 508, the controller calculates the size of silver partition 143 based on a higher of (3) applying a third weighted value to the predicted size of silver partition 143, and (4) a sum of the calculated sizes of prime partition 141 and gold partition 142 subtracted from the total size of cache 140. In step 510, the controller directs a power down of unused cache lines based on the calculated partition sizes. In step 512, the controller writes the calculated partition sizes to MPAM registers to adjust the size of partitions 141-143. Steps 502-512 may repeat to continuously adjust the size of partitions 141-143 and power down any unused portions for power efficiency.

Figure 6:
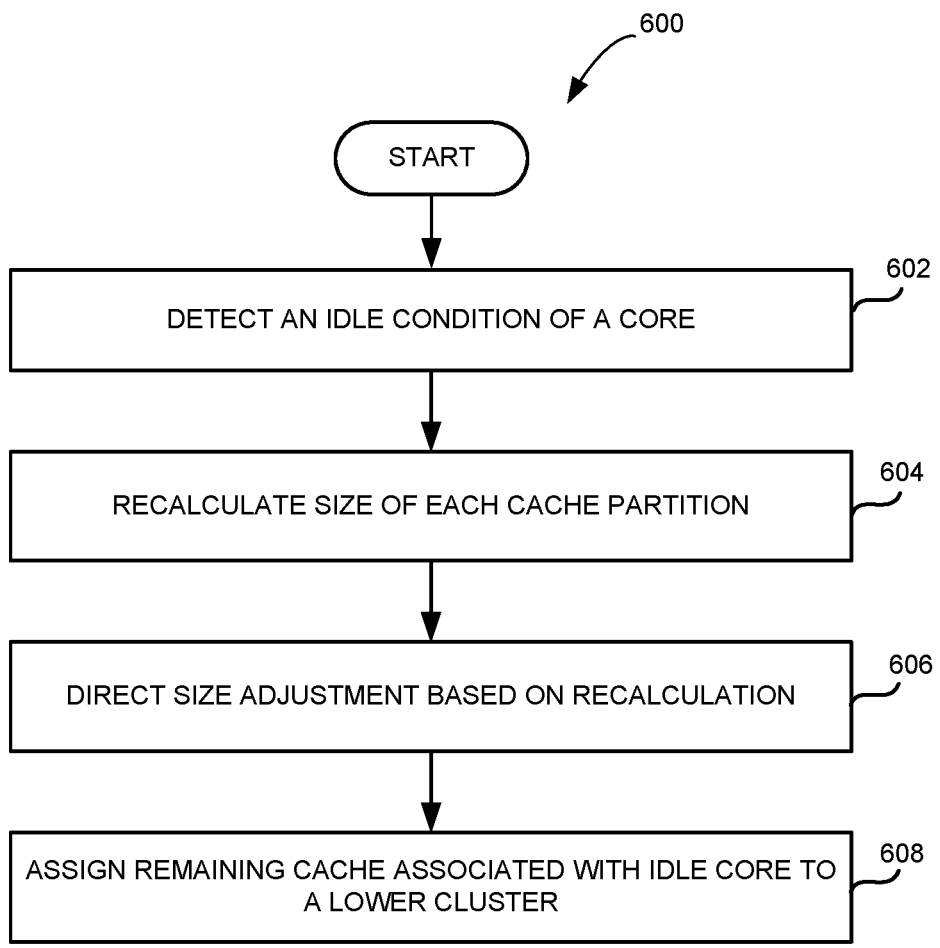
FIG. 6 is a flowchart illustrating a method of reassigning cache among HMP cores in an example embodiment.

FIG. 6 is a flowchart illustrating a method 600 of reassigning cache among HMP cores in an example embodiment. In step 602, a controller detects an idle condition of a core. In step 604, the controller recalculates the size of each partition 141-143 in response to detecting the idle condition. In step 606, the controller directs size adjustment of partitions 141-143 based on the recalculation. And, in step 608, the controller assigns the remaining cache associated with the idle core to a lower cluster. For example, in response to detecting an idle gold core 132, the controller may incorporate an unused portion of gold core partition 142 into silver core partition 143.

Although FIGS. 1-6 are described with respect to an HMP architecture with three core types and corresponding partitions and task types, it will be appreciated that an alternative number, such as two or four or more, are also applicable to the embodiments described herein. The methods described in connection with the embodiments disclosed herein may be embodied directly in hardware, in processor executable instructions encoded in non-transitory machine readable medium, or as a combination of the two.

Figure 7:
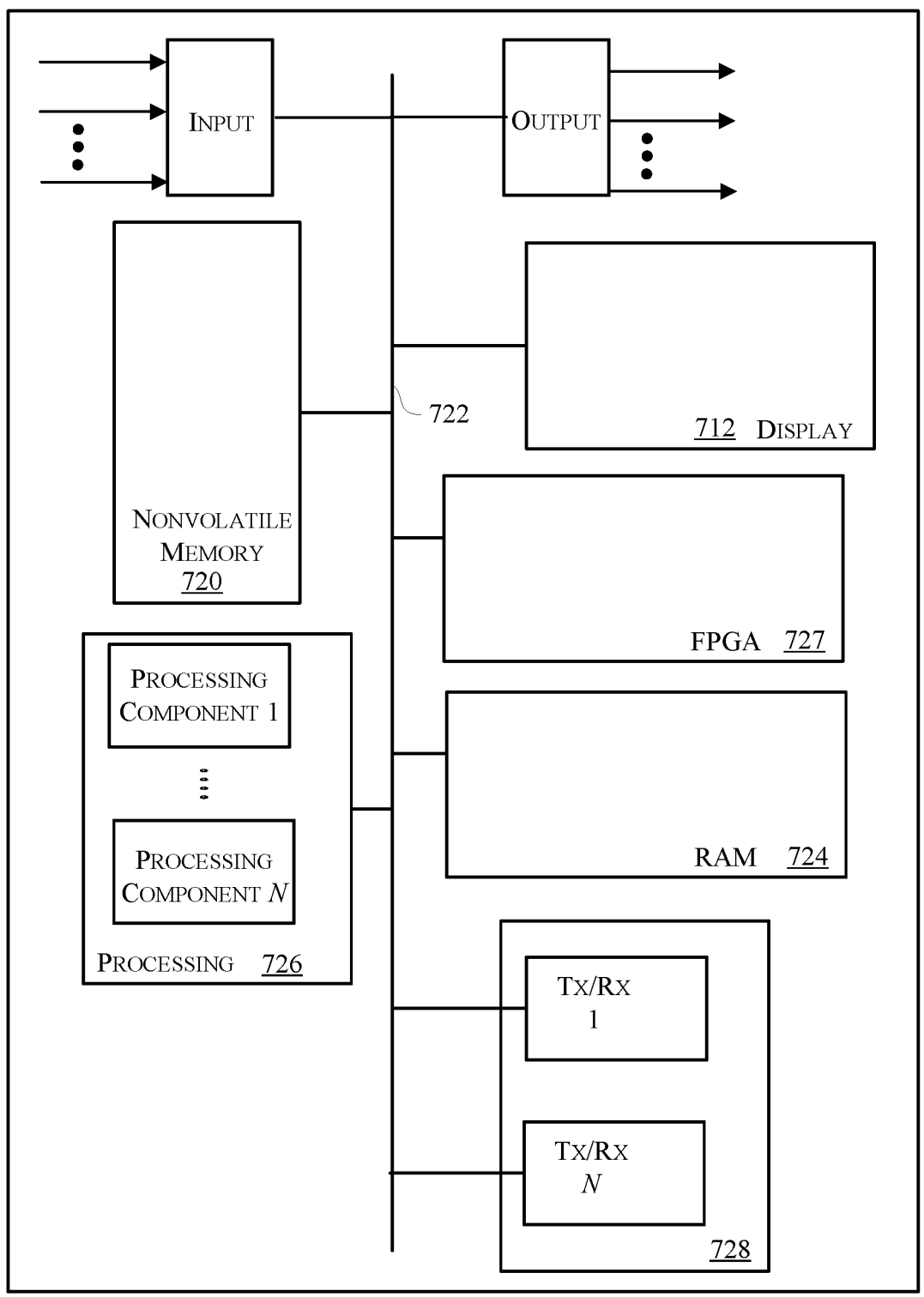
FIG. 7 is a block diagram depicting physical components that may be used to implement a controller in accordance with an embodiment of this disclosure.

Referring to FIG. 7 for example, shown is a block diagram depicting physical components that may be utilized to realize one or more of the components of FIG. 1. As shown, in this embodiment a display portion 712 and nonvolatile memory 720 are coupled to a bus 722 that is also coupled to random access memory ("RAM") 724, a processing portion (which includes N processing components) 726, a field programmable gate array (FPGA) 727, and a transceiver component 728 that includes N transceivers. Although the components depicted in FIG. 7 represent physical components, FIG. 7 is not intended to be a detailed hardware diagram; thus, many of the components depicted in FIG. 7 may be realized by common constructs or distributed among additional physical components. Moreover, it is contemplated that other existing and yet-to-be developed physical components and architectures may be utilized to implement the functional components described with reference to FIG. 7.

Display portion 712 generally operates to provide a user interface for a user, and in several implementations, the display is realized by a touchscreen display. In general, the nonvolatile memory 720 is non-transitory memory that functions to store (e.g., persistently store) data and machine readable (e.g., processor readable and executable) code (including executable code that is associated with effectuating the methods described herein). In some embodiments, for example, the nonvolatile memory 720 includes bootloader code, operating system code, file system code, and non-transitory processor-executable code to facilitate the execution of the methods (e.g., the method described with reference to FIGS. 2-6) described herein.

In many implementations, the nonvolatile memory 720 is realized by flash memory (e.g., NAND or ONENAND memory), but it is contemplated that other memory types may be utilized as well. Although it may be possible to execute the code from the nonvolatile memory 720, the executable code in the nonvolatile memory is typically loaded into RAM 724 and executed by one or more of the N processing components in the processing portion 726.

In operation, the N processing components in connection with RAM 724 may generally operate to execute the instructions stored in nonvolatile memory 720 to realize the functionality of cache control logic 150. For example, non-transitory processor-executable instructions to effectuate the methods described herein may be persistently stored in nonvolatile memory 720 and executed by the N processing components in connection with RAM 724. As one of ordinary skill in the art will appreciate, the processing portion 726 may include a video processor, digital signal processor (DSP), graphics processing unit (GPU), and other processing components.

In addition, or in the alternative, the field programmable gate array (FPGA) 727 may be configured to effectuate one or more aspects of the methodologies described herein. For example, non-transitory FPGA-configuration-instructions may be persistently stored in nonvolatile memory 720 and accessed by the FPGA 727 (e.g., during boot up) to configure the FPGA 727 to effectuate the functions of cache control logic 150.

The depicted transceiver component 728 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
a plurality of Heterogeneous Multi-Processing (HMP) cores having different levels of processing capability;
a cache including cache partitions assigned to the different levels of the HMP cores;
a performance monitoring unit (PMU) configured to track a performance attribute for each of the cache partitions; and
a controller configured, for each of a plurality of successive time windows, to:
obtain a performance value for each of the cache partitions based on the performance attribute tracked by the PMU;
determine a predicted cache size for each of the cache partitions based on performance values obtained for a previous N successive time windows, wherein N is an integer greater than one;
calculate a cache size for each of the cache partitions by multiplying the predicted cache size with a weighted value, wherein the weighted value is larger for a cache partition associated with a HMP core having higher processing capability; and
direct a size adjustment of each of the cache partitions based on the calculated cache size.

2. The apparatus of claim 1, further comprising:
a Memory System Resource Partitioning And Monitoring (MPAM) module including hardware registers configured to dynamically partition the cache;
wherein the controller is configured to direct the size adjustment of each of the cache partitions based on write commands issued to the hardware registers of the MPAM module.

3. The apparatus of claim 1, wherein:
the controller is configured to determine the predicted cache size for each of the cache partitions based on a count of cache misses for each of the cache partitions for the previous N successive time windows.

4. The apparatus of claim 1, wherein:
the controller is configured to determine the predicted cache size for each of the cache partitions based on a count of payload bytes of memory bandwidth usage for each of the cache partitions for the previous N successive time windows.

5. The apparatus of claim 1, wherein:
the controller is configured to determine the predicted cache size for each of the cache partitions based on one or more of an instruction count, cycle count, and reference count for each of the cache partitions for the previous N successive time windows.

6. The apparatus of claim 1, wherein:
the controller is configured, in response to detecting an idle condition of a HMP core, to recalculate the cache size for each of the cache partitions.

7. The apparatus of claim 1, wherein:
the HMP cores include a first core type having a high processing capability, a second core type having a moderate processing capability, and a third core type having a lower processing capability;
the cache is an L3 cache including a first cache partition assigned to the first core type, a second cache partition assigned to the second core type, and a third cache partition assigned to the third core type; and
the controller is configured to prioritize cache resources to cores with higher processing capabilities by:
applying a first weighted value to the first cache partition;
applying a second weighted value to the second cache partition, wherein the second weighted value is smaller than the first weighted value; and applying a third weighted value to the third cache partition, wherein the third weighted value is smaller than the second weighted value, and wherein each of the first, second, and third weighted values are configurable.

8. A method for dynamically partitioning a cache shared by a plurality of Heterogeneous Multi-Processing (HMP) cores having different levels of processing capability, the method comprising:
partitioning the cache into cache partitions assigned to the different levels of the HMP cores;
tracking a performance attribute for each of the cache partitions; and
for each of a plurality of successive time windows:
obtaining a performance value for each of the cache partitions based on the performance attribute tracked;
determining a predicted cache size for each of the cache partitions based on performance values obtained for a previous N successive time windows, wherein N is an integer greater than one;
calculating a cache size for each of the cache partitions by multiplying the predicted cache size with a weighted value, wherein the weighted value is larger for a cache partition associated with a HMP core having higher processing capability; and
directing a size adjustment of each of the cache partitions based on the calculated cache size.

9. The method of claim 8, wherein:
directing the size adjustment includes issuing write commands to hardware registers of a Memory System Resource Partitioning And Monitoring (MPAM) module to dynamically partition the cache.

10. The method of claim 8, wherein:
determining the predicted cache size for each of the cache partitions is based on a count of cache misses for each of the cache partitions for the previous N successive time windows.

11. The method of claim 8, wherein:
determining the predicted cache size for each of the cache partitions is based on a count of payload bytes of memory bandwidth usage for each of the cache partitions for the previous N successive time windows.

12. The method of claim 8, further comprising:
determining the predicted cache size for each of the cache partitions is based on one or more of an instruction count, cycle count, and reference count for each of the cache partitions for the previous N successive time windows.

13. The method of claim 8, further comprising:
in response to detecting an idle condition of a HMP core, recalculating the cache size for each of the cache partitions.

14. A non-transitory processor-readable medium comprising instructions for execution by a processor or for configuring a field programmable gate array, the instructions configured for dynamically partitioning a cache shared by a plurality of Heterogeneous Multi-Processing (HMP) cores having different levels of processing capability, and the instructions comprising instructions to:
partition the cache into cache partitions assigned to the different levels of the HMP cores;
track a performance attribute for each of the cache partitions; and
for each of a plurality of successive time windows:
obtain a performance value for each of the cache partitions based on the performance attribute tracked;
determine a predicted cache size for each of the cache partitions based on performance values obtained for a previous N successive time windows, wherein N is an integer greater than one;
calculate a cache size for each of the cache partitions by multiplying the predicted cache size with a weighted value, wherein the weighted value is larger for a cache partition associated with a HMP core having higher processing capability; and
direct a size adjustment of each of the cache partitions based on the calculated cache size.

15. The non-transitory processor-readable medium of claim 14, wherein the instructions comprise instructions to:
direct the size adjustment by issuing write commands to hardware registers of a Memory System Resource Partitioning And Monitoring (MPAM) module to dynamically partition the cache.

16. The non-transitory processor-readable medium of claim 15, wherein the instructions comprise instructions to:
determine the predicted cache size for each of the cache partitions based on a count of cache misses for each of the cache partitions for the previous N successive time windows.

17. The non-transitory processor-readable medium of claim 14, wherein the instructions comprise instructions to:
determine the predicted cache size for each of the cache partitions based on a count of payload bytes of memory bandwidth usage for each of the cache partitions for the previous N successive time windows.

18. The non-transitory processor-readable medium of claim 17, the instructions comprise instructions to:
determine the predicted cache size for each of the cache partitions based on one or more of an instruction count, cycle count, and reference count for each of the cache partitions for the previous N successive time windows.

19. The non-transitory processor-readable medium of claim 14, wherein instructions comprise instructions to:
determine the predicted cache size for each of the cache partitions based on one or more of an instruction count, cycle count, and reference count for each of the cache partitions for the previous N successive time windows.

20. The non-transitory processor-readable medium of claim 14, wherein:
the HMP cores include a first core type having a high processing capability, a second core type having a moderate processing capability, and a third core type having a lower processing capability;
the cache is an L3 cache including a first cache partition assigned to the first core type, a second cache partition assigned to the second core type, and a third cache partition assigned to the third core type; and
the instructions comprise instructions to prioritize cache resources to cores with higher processing capabilities by:
applying a first weighted value to the first cache partition;
applying a second weighted value to the second cache partition, wherein the second weighted value is smaller than the first weighted value; and
applying a third weighted value to the third cache partition, wherein the third weighted value is smaller than the second weighted value, and wherein each of the first, second, and third weighted values are configurable.

* * * * *